(12) United States Patent
Sarkas et al.

(10) Patent No.: US 12,485,075 B2
(45) Date of Patent: Dec. 2, 2025

(54) PARTICULATES OF POLYPHENOLICS AND DISPERSIONS THEREOF

(71) Applicant: Nanophase Technologies Corporation, Romeoville, IL (US)

(72) Inventors: Harry W. Sarkas, Shorewood, IL (US); Christopher C. Boffa, Joliet, IL (US); Lucas T. Tesar, Aurora, IL (US); Kevin Cureton, Evanston, IL (US)

(73) Assignee: Solésence, Inc., Romeoville, IL (US)

( * ) Notice: Subject to any disclaimer, the term of this patent is extended or adjusted under 35 U.S.C. 154(b) by 871 days.

(21) Appl. No.: 17/386,299

(22) Filed: Jul. 27, 2021

(65) Prior Publication Data

US 2022/0016003 A1 Jan. 20, 2022

Related U.S. Application Data

(63) Continuation of application No. PCT/US2021/042087, filed on Jul. 16, 2021.

(60) Provisional application No. 63/052,675, filed on Jul. 16, 2020.

(51) Int. Cl.
| | | |
|---|---|---|
| *A61K 8/34* | (2006.01) | |
| *A61K 8/58* | (2006.01) | |
| *A61K 8/60* | (2006.01) | |
| *A61Q 17/04* | (2006.01) | |

(52) U.S. Cl.
CPC .............. *A61K 8/347* (2013.01); *A61K 8/585* (2013.01); *A61K 8/602* (2013.01); *A61Q 17/04* (2013.01); *A61K 2800/412* (2013.01); *A61K 2800/805* (2013.01)

(58) Field of Classification Search
CPC ........ A61K 8/347; A61K 8/585; A61K 8/602; A61K 2800/412; A61K 2800/805; A61Q 17/04
See application file for complete search history.

(56) References Cited

U.S. PATENT DOCUMENTS

| | | | |
|---|---|---|---|
| 5,780,060 | A | 7/1998 | Levy et al. |
| 6,500,411 | B2 | 12/2002 | SenGupta et al. |
| 6,716,418 | B2 | 4/2004 | SenGupta et al. |
| 8,309,063 | B2 | 11/2012 | SenGupta et al. |
| 8,445,562 | B2 | 5/2013 | Balakshin et al. |
| 8,911,976 | B2 | 12/2014 | Uraki et al. |
| 10,035,928 | B2 | 7/2018 | Liu et al. |
| 2003/0069302 | A1 | 4/2003 | Zielinski |
| 2007/0178057 | A1 | 8/2007 | SenGupta et al. |
| 2007/0237847 | A1* | 10/2007 | Henry ............... A61Q 19/02 424/769 |
| 2009/0035242 | A1 | 2/2009 | Maes et al. |
| 2010/0202985 | A1 | 8/2010 | SenGupta |
| 2015/0166836 | A1 | 6/2015 | Liu et al. |
| 2018/0291210 | A1 | 10/2018 | Sarkas et al. |

FOREIGN PATENT DOCUMENTS

| | | |
|---|---|---|
| EP | 2412431 | 2/2012 |
| WO | 2009/038477 | 3/2009 |
| WO | 2010/019413 | 2/2010 |
| WO | 2011/156311 | 12/2011 |
| WO | 2014/144746 | 9/2014 |
| WO | 2014/164418 | 10/2014 |
| WO | 2017/197530 | 11/2017 |

OTHER PUBLICATIONS

D'Archivio, M. et al., "Bioavailability of the polyphenols: status and controversies", International Journal of Molecular Sciences, vol. 11, pp. 1321-1342, (2010).
"Showing all foods in which the polyphenol Quercetin 3-O-rutinoside is found", Phenol Explorer, pp. 1-7, found at phenol-explorer. eu/contents/polyphenol/296, printed on Apr. 25, 2023.
Crozier, A. et al., "Flavonoids", Oregon State University Linus Pauling Institute Micronutrient Information Center, pp. 1-42, found at https://lpi.oregonstate.edu/book/export/html/484, printed on Apr. 25, 2023.
Ganeshpurkar, A. et al., "The pharmacological potential of rutin", Saudi Pharmaceutical Journal, vol. 25, pp. 149-164, (2017).
Pandey, K.B. et al., "Plant polyphenols as dietary antioxidants in human health and disease", Oxidative Medicine and Cellular Longevity, vol. 2, No. 5, pp. 270-278. (2009).
Vostalova, J. et al., "Skin protective activity of silymarin and its flavonolignans", Molecules, vol. 24, No. 1022, pp. 1-12. (2019).
Frutos. M.J. et al., "Rutin", Nonvitamin and Nonmineral Nutritional Supplements, chapter 2.14, pp. 111-117. (2019).
Dammak, I. et al., "Formulation and stability characterization of rutin-loaded oil-in-water emulsions", Food Bioprocess Technology, vol. 10. pp. 926-939, (2017).
Palliyage, G.H. et al., "Pharmaceutical topical delivery of poorly soluble polyphenols: Potential role in prevention and treatment of melanoma", AAPS PharmSciTech, vol. 20, article No. 250, (2019).
Sharma O.P. et al., "DPPH antioxidant assay revisited", Food Chemistry, vol. 113, issue 4, pp. 1202-1205, (2009).
Bleasel, M.D. et al., "In vitro evaluation of sun protection factors of sunscreen agents using a novel UV spectrophotometric technique", International Journal of Cosmetic Science, vol. 30, issue 4, pp. 259-270, (2008).
International Search Report and written opinion dated Oct. 28, 2021 for PCT application No. PCT/US2021/042087.
Scalbert, A. et al., "Polyphenols; antioxidants and beyond", The American Journal of Clinical Nutrition, vol. 81, issue 1, pp. 215S-217S. (2005).

* cited by examiner

*Primary Examiner* — Robert A Wax
*Assistant Examiner* — Olga V. Tcherkasskaya
(74) *Attorney, Agent, or Firm* — EVAN LAW GROUP LLC (57) ABSTRACT

A composition includes polyphenolic particles and a surfactant, on the polyphenolic particles. The composition is lipophilic. The polyphenolic particles are non-pigmentary. A dispersion includes the polyphenolic particles, the surfactant, and a carrier vehicle. The carrier vehicle may be a cosmetically-acceptable fluid or a wax that is lipophilic.

1 Claim, 2 Drawing Sheets

PARTICULATES OF POLYPHENOLICS AND DISPERSIONS THEREOF

BACKGROUND

Polyphenols (also referred to as "polyphenolics") are a class of molecules that are characterized by the presence of a plurality of —OH groups on aromatic rings. Polyphenols may be generally classified as phenolic acids, hydroxycinnamic acids, hydroxybenzoic acids and flavonoids. Polyphenols have a number of unique properties, such as the ability to function as antioxidants and the ability to absorb ultraviolet (UV) radiation. Some polyphenols have also been used as disinfectants due to their antimicrobial or germicidal properties.

Polyphenols occur naturally in the leaf tissue, the epidermis, bark layers, flowers and fruits of various plants including fruits, vegetables and cereals. Natural polyphenols are present in food and drinks including berries, wine, beer, tea, coffee, olive oil, cocoa, chocolate, cider, fruit juices, vinegar, herbs, spices and nuts (D'Archivio, M. et al., "Bioavailability of the polyphenols: status and controversies", International Journal of Molecular Sciences, Vol. 11, pp. 1321-1342 (2010)). Plant polyphenols have been recognized as dietary sources of antioxidants (Pandey, K. B. et al., "Plant polyphenols as dietary antioxidants in human health and disease", Oxidative Medicine and Cellular Longevity, Vol. 2, No. 5, pp. 270-278 (2009)). Polyphenols also occur naturally in microorganisms and may be found in bacteria such as actinobacteria, cyanobacteria and proteobacteria, yeast, fungi such as mushrooms, lichen and algae.

Flavonoids, including the major subclasses known as anthocyanins or anthocyanidins, flavan-3-ols, flavonols, flavanones, flavones, and isoflavones, have been the subject of many recent studies due to their potential therapeutic benefits. Research into flavonoids indicates that they exhibit anti-inflammatory, antithrombogenic, antidiabetic, anticancer, and neuroprotective activities, and that flavonoids may be beneficial for metabolic health, cardiovascular health, vascular endothelial function, glycemic control in diabetic patients and cognitive function (Crozier, A. et al., "Flavonoids", Oregon State University Linus Pauling Institute Micronutrient Information Center, available online at lpi.oregonstate.edu/book/export/html/484 (2016)). Flavonoids are present in many foods and will be ingested as part of a diet rich in fruit and vegetables. However, dietary flavonoids provide very few health benefits because their bioavailability is low since they are rapidly excreted by the body.

Rutin (also known as rutoside, quercetin-3-O-rutinoside and sophorin) is a well-known flavonoid that is the glycoside of quercetin and rutinose. Dietary sources of rutin include citrus fruits, buckwheat, asparagus, apples, peaches, capers, olives, raspberries, currants, plums/prunes, blackberries, cherry tomatoes, grapes/raisins, zucchini, apricots and tea ("Showing all foods in which the polyphenol Quercetin 3-O-rutinoside is found", Phenol Explorer, available online at phenol-explorer.eu/contents/polyphenol/296, accessed on Mar. 13, 2020). Rutin is also found in the plants *Carpobrotus edulis* (also known as Hottentot-fig, ice plant, highway ice plant, pigface and sour fig) and *Ruta graveolens* (also known as rue, common rue or herb-of-grace). Rutin has been shown to possess antioxidant, cytoprotective, vasoprotective, anticarcinogenic, neuroprotective and cardioprotective activities (Ganeshpurkar, A. et al., "The pharmacological potential of rutin", Saudi Pharmaceutical Journal, Vol. 25, pp. 149-164 (2017)). Notably, rutin has been shown to reduce UV-B induced inflammation, and 10% w/w oil-in-water emulsions of rutin provide sun protection factor (SPF) values approaching 30 (Ganeshpurkar et al.).

Silibinin (also known as silybin or SB) is another polyphenol that provides UV radiation protection. Silibinin is found in the extract of milk thistle (*Silybum marianum*) seeds. The milk thistle plant is a well-known medicinal plant that has been used for treating liver disorders, cancer and death cap mushroom poisoning. Silymarin (SM) is a standardized extract of milk thistle seeds that contains flavonolignans (70-80%) including silybin, isosilybin (ISB), silychristin (SC), silydianin (SD), 2,3-dehydrosilybin (DHSB), dehydrosilychristin, and taxifolin, and a chemically undefined fraction and oxidized polyphenolic compounds (20-30%). Silymarin and its flavonolignans were shown to provide UV-A and UV-B protection, scavenge free radicals, reduce UV-B and chemically-induced damage, exhibit anti-collagenase activity and exhibit anti-elastase activity (Vostalova, J. et al., "Skin protective activity of silymarin and its flavonolignans", Molecules, Vol. 24, No. 1022, 12 pages (2019)). These results indicate that milk thistle extract is an effective source of polyphenols for skin protectant formulations and preventing photoaging of the skin.

The unique properties of polyphenols, especially their antioxidant and UV protectant properties, would make these substances desirable ingredients in formulations. For example, topically applied formulations may provide an alternative administration route for poorly bioavailable dietary flavonoids. Despite their availability in natural products that are renewable resources, formulation challenges have limited the demand for polyphenol ingredients, such as polyphenolic particles. Some polyphenols, such as rutin, silibinin and resveratrol, have poor water solubility. Other polyphenols are highly water soluble, which restricts their use to the water phase of formulations. The high water solubility of certain polyphenols also limits their inclusion in topical formulations in the solid state since the polyphenols will wash off the skin of a user if exposed to water. These solubility concerns have restricted the ability of manufacturers to take full advantage of the useful properties of polyphenols.

Rutin has low solubility in water at 0.125 g/L and limited solubility in bulk oils, such as soybean oil, of 0.1% by weigh, severely limiting the use of this beneficial antioxidant (M. J. Frutos, L. Rincon, and E. Valero-Cases in Nonvitamin and Nonmineral Nutritional Supplements 2019, Chapter 2.14, pp. 111-117 and I. Dammak, and P. J. do Amaral Sorbal, Food Bioprocess Technol., 10, 926-939, (2017)). Various approaches have been used to overcome low water solubility. These are described in detail in a review article, where the disadvantages of each approach are discussed (G. H. Palliyage, S. Singh, C. R. Ashby, Jr., A. K. Tiwari, and H Chauhan AAPS PharmSciTech 20, 250 (2019)). Liposomal lipid bilayer approaches where the ingredient of interest is captured in a spherical vesicle having a lipid bilayer have the disadvantages that the phospholipid forming the vesicles undergoes oxidation and degradation due to high-pressure homogenization required to form the vesicles, special storage is required due to the inherent low thermal stability, and the encapsulation efficiency is low with hydrophobic polyphenols. Polymeric shell-structures formed by amphiphilic polymers have the problems of being highly unstable and having a low carrying capacity (G. H. Palliyage, S. Singh, C. R. Ashby, Jr., A. K. Tiwari, and H Chauhan AAPS PharmSciTech 20, 250 (2019)). Nanoparticle dispersions in lipids result in low ingredient carrying capacity, a high propensity for thermal degradation of the active ingredient due to the temperatures required to process the solid lipid matrix, and exhibit poor long-term stability due to high interfacial surface energy resulting in aggregation. Finally, hydrogels have the disadvantages of a limited range of polymer systems and the complexes are mechanically weak and unstable under mixing.

SUMMARY

In a first aspect, the invention is a composition comprising polyphenolic particles and a surfactant, on the polyphenolic particles. The polyphenolic particles are non-pigmentary.

In a second aspect, the invention is a dispersion comprising rutin particles, a surfactant and a carrier vehicle. The rutin particles have a particle size of 0.1-1.0 microns. The dispersion is pourable.

In a third aspect, the invention is a dispersion comprising a silanized polyphenolic particle and a carrier vehicle.

In a fourth aspect, the invention is lipophilic rutin particles. The rutin particles have a particle size of 0.05-0.5 microns (μm).

Definitions

The term "polyphenol" or "polyphenolic" means a substance that includes a plurality of —OH groups on non-heterocyclic aromatic rings. As used in this application, the terms "polyphenol" and "polyphenolic" do not include polymers or polymeric substances.

The term "non-pigmentary" means a substance that has a UV absorption maximum ($\lambda_{Max}$) of 400 nm or less.

The term "ultraviolet radiation" means electromagnetic radiation with a wavelength of 10-400 nm. Ultraviolet radiation is also referred to as ultraviolet light, UV radiation or UV light. The abbreviation "UV" is used interchangeably with the phrase "ultraviolet light" in the application.

The term "high energy visible radiation" or "HEV radiation" means electromagnetic radiation having a wavelength of 400-490 nm. HEV radiation is perceived as blue and violet light in the visible spectrum.

The term "particle size" means the median (D50) particle size as determined by static light scattering (ISO 13320: 2009 Particle Size Analysis—Laser Diffraction Methods) on a number distribution basis, unless otherwise indicated.

The term "very water resistant" means a composition that exhibits a change in monochromatic protection factor (MPF) of less than 50% between its MPF prior to water exposure and its MPF following an 80-minute water immersion sequence in vitro. (Cosmetics Europe, "Guidelines for evaluating sun product water resistance", available online at www.cosmeticseurope.eu/files/7914/6407/7400/Guidelines-_for_Evaluating_Sun_Produc t_Water_Resistance_-_2005.pdf, 15 pages (2005)).

The fluidity of dispersions of powders is measured using the following run-off distance test. Three drops (75 mg) of the dispersion from a pipette are placed onto a clean glass plate substrate while the surface is in a horizontal position. The glass substrate is then held upright for 120 seconds at an angle of 90 degrees to allow the dispersion to flow. The fluidity of the dispersion is expressed as the distance the dispersion flows from the origin. (This test was only used during initial screening; a measured run-off distance of 164±10 mm (reported as standard error) from the origin corresponds to a viscosity of 145±25 cP (reported as standard error) at a shear rate of 20 s−1.). A dispersion is considered to be pourable if it shows a run-off distance exceeding 100 mm.

All percentages (%) are weight/weight percentages, unless stated otherwise.

BRIEF DESCRIPTION OF THE DRAWINGS

The invention can be better understood with reference to the following drawings and description.

DETAILED DESCRIPTION

The present invention includes polyphenolic particles that have been modified to be lipophilic. Lipophilic polyphenolic particles may be formed by adding a surface treatment to the particles or by reacting the particles with a silanizing agent. The lipophilic modification enables the polyphenolic particles to be present in the solid state in the oil phase of formulations. For example, polyphenolic particles and a surfactant may be dispersed in a lipophilic carrier vehicle. The ability to use polyphenolic particles in the oil phase greatly expands the possible uses of polyphenolic particles that are highly water soluble in their unmodified state. Preferably, the polyphenolic particles are non-pigmentary.

The present invention overcomes solubility problems by coating surfactant directly on to the surface of polyphenolic particles forming a surface modified polyphenolic particle which exhibits long term stability, allowing incorporation into a variety of carrier fluids, which allows for the delivery of high polyphenolic concentrations.

Experimental tests have revealed that preparations including lipophilic polyphenolic particles possess a number of desirable physical and chemical properties. These preparations are very water resistant and are strong HEV light blockers, which indicates they are well-suited for use in sunscreen formulations. Rutin particles are a particularly desirable UV protectant for sunscreens.

Preparations that include polyphenolic particles also offer a number of commercial advantages. Many polyphenols may be obtained from natural products, which makes them economically-favorable raw materials. Plant-based sources of polyphenols are particularly desirable since they are renewable resources. Polyphenols that are derived from natural sources may be marketed as natural products, which is attractive to consumers. Furthermore, dispersions of polyphenolic particles may be manufactured using conventional chemical processing techniques that do not require expensive reactants, extreme temperatures, long reaction times or hazardous reactants, and do not produce hazardous wastes. All of these advantages will encourage manufacturers to include polyphenolic particles in commercial formulations.

Figure 1:
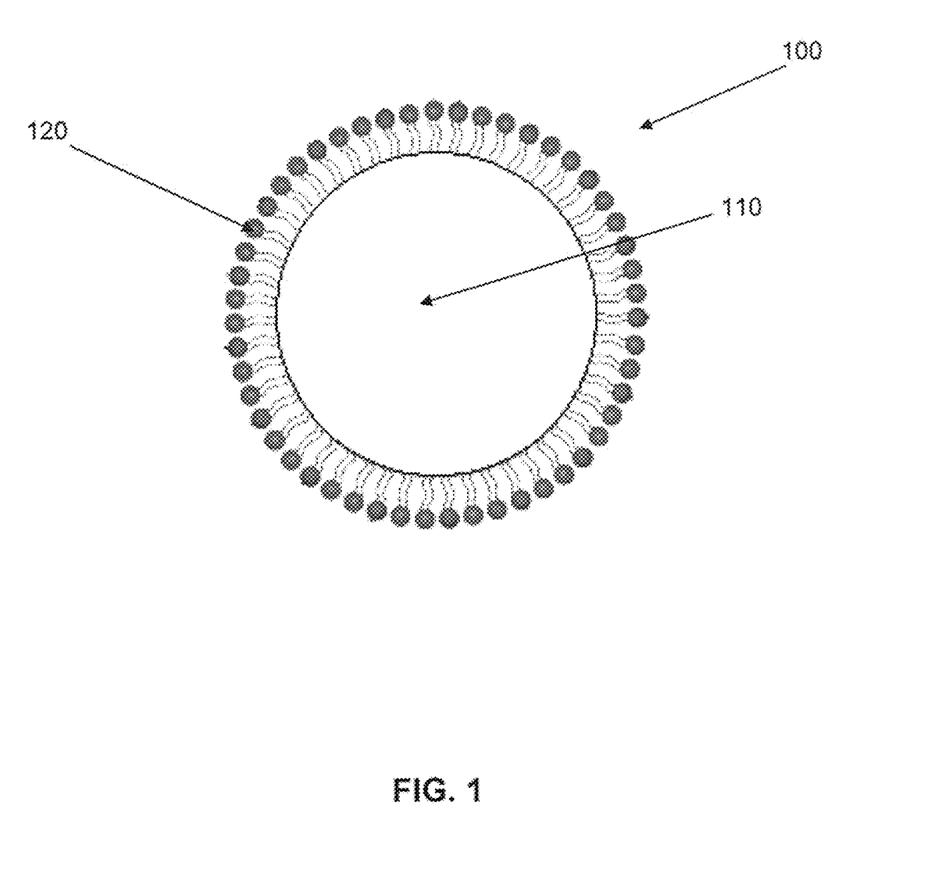
FIG. 1 is a schematic representation of a polyphenolic particle that has been modified with a surfactant.

FIG. 1 illustrates a schematic representation of a polyphenolic particle that has been modified with a surfactant. A composition 100 includes a polyphenolic particle 110 and a surfactant 120 on the surface of the particle. The surfactant is a surface treatment that makes the polyphenolic particles lipophilic and resistant to dissolution in water. A dispersion may be prepared by combining the polyphenolic particles, the surfactant and a carrier vehicle. Preferably, the dispersion is pourable.

The polyphenolic particles may be any substance having a plurality of —OH groups on non-heterocyclic aromatic rings. Preferably, the polyphenolic particles are non-pigmentary, meaning they have a UV absorption maximum ($\lambda_{Max}$) of 400 nm or less. The polyphenolic particles exclude colorants that have been approved by the U.S. Food and Drug Administration (FDA), such as carotenoids, carotenes, β-carotene, astaxanthins, retinoids, curcuminoids, lycopene, annatto and other substances identified in 21 C.F.R. § 73 (Listing of Color Additives Exempt from Certification). The polyphenolic particles also exclude polymers or polymeric substances, such as lignin, tannins or humates.

The polyphenolic particles may be classified as phenolic acids, hydroxycinnamic acids, hydroxybenzoic acids and flavonoids, as well as derivatives of these acids such as glucosides and acetylated acids. Examples of suitable hydroxycinnamic acids include caffeic acid, chicoric acid and chlorogenic acid, as well as hydroxycinnamoyltartaric acids such as caftaric acid. Examples of suitable hydroxybenzoic acids include dihydroxybenzoic acids, such as hypocgallic acid, α-resorcyclic acid, O-resorcyclic acid, γ-resorcyclic acid, gentisic acid, protocatechuic acid and orsellinic acid, and trihydroxybenzoic acids, such as gallic acid, phloroglucinol carboxylic acid, bergenin, norbergenin, theogallin, chebulic acid, ethyl gallate, eudesmic acid, methyl gallate and syringic acid. Polyphenolic particles that are flavonoids may be further classified into the major flavonoid subgroups of anthocyanins or anthocyanidins, flavan-3-ols, flavonols, flavanones, flavones, and isoflavones. Many members of these classes are considered to be polyphenolic and non-pigmentary, as those terms have been defined above, but some members may not.

Preferred polyphenolic particles include rutin, quercetin, quercetinol glucoside, astragalin, myricetin, resveratrol, mangiferin, emodin, genistein, cannabinoids, cannabidiol (CBD), cannabigerol (CBG), catechin, epicatechin, chlorogenic acid, gallic acid, olivetol, olivetolic acid, pallidol, ellagic acid, piceid, malvidin, chrysanthemin, miquelianin and polyphenols found in the *Silybum marianum* extract silymarin (SM) such as silibinin (SB), isosilybin (ISB), silychristin (SC), silydianin (SD), dehydrosilybin (DHSB), dehydrosilychristin, and taxifolin. Rutin is an especially preferred polyphenolic particle.

Figure 2:
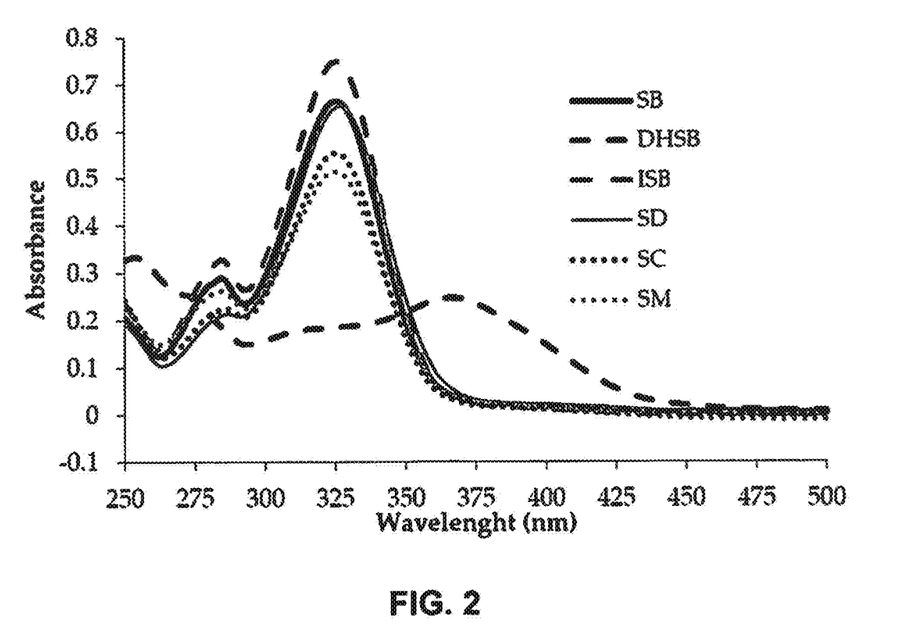
FIG. 2 is a graph of the ultraviolet light absorption spectra of silymarin and its constituent polyphenols.

Polyphenolic particles may be evaluated to determine if they are non-pigmentary by analyzing their ultraviolet light absorption spectra. This may be done experimentally, or by analysis of UV absorption spectra found in scientific literature. For example, FIG. 2 is a graph of the ultraviolet light absorption spectra of silymarin and its constituent polyphenols obtained from Vostalova, J. et al. As shown in FIG. 2, the UV absorption maximum of silymarin and its constituent polyphenols is below 400 nm, indicating that these substances are non-pigmentary.

Polyphenolic particles that exhibit some visible light absorption are preferably present in formulations at sufficiently low concentrations to prevent the color imparted by the particles from being commercially significant to consumers when applied to skin. Alternatively, the color imparted by polyphenolic particles may be masked by other ingredients in the formulation, such as pigments and dyes.

The polyphenolic particles may be obtained from natural substances, such as plants and microorganisms. However, synthetic polyphenolic particles and synthetic analogs of natural polyphenolic particles may also be used. Polyphenolic particles may be obtained from fruits, vegetables, cereals, bacteria such as actinobacteria, cyanobacteria and proteobacteria, yeast, fungi such as mushrooms, lichen and algae.

Examples of plant-based sources of polyphenolic particles include citrus fruits (members of the genus *Citrus* such as oranges (*Citrus×sinensis*), lemons (*Citrus limon* (L.) Osbeck), limes (*Citrus×latifolia*), grapefruit (*Citrus×paradisi*) and tangerines (*Citrus* reticula L. var.)), buckwheat (*Fagopyrum esculentum*), asparagus (*Asparagus officinalis*), apples (*Malus domestica*), peaches (*Prunus persica*), capers (*Capparis spinosa*), onions (*Allium cepa* L.), black radish (*Raphanus sativus* L. var. *niger* J. Kern), raspberries and blackberries (members of the genus *Rubus*, such as *Rubus idaeus, Rubus occidentalis, Rubus leucodermis, Rubus ursinus, Rubus armeniacus* and *Rubus allegheniensis*), currants or gooseberries (members of the genus *Ribes*, the subgenus *Ribes* L and the subgenus *Grossularia*), plums and apricots (members of the subgenus *Prunus* of the genus *Prunus*, such as *Prunus domestica* subsp. *Insititia, Prunus insititia, Prunus domestica, Prunus armeniaca*), tomatoes (*Solanum lycopersicum*), cherry tomatoes (*Solanum lycopersicum* var. *cerasiforme*), grapes (members of the genus *Vitis*, such as *Vitis vinifera, Vitis labrusca, Vitis riparia, Vitis rotundifolia* and *Vitis amurensis*), zucchini (*Cucurbita pepo*), chili peppers (members of the genus *Capsicum* such as *Capsicum annuum, Capsicum baccatum, Capsicum chinense, Capsicum frutescens* and *Capsicum pubescens*), peanuts (*Arachis hypogaea*), cocoa (*Theobroma cacao*), tea (*Camellia sinensis*), coffee (members of the genus *Coffea* such as *Coffea arabica* and *Coffea canephora*), beets (*Beta vulgaris*), blueberries (*Vaccinium* Section *Cyanococcus*), eggplant (*Solanum melongena*), figs (*Ficus carica*), red cabbage (*Brassica oleracea* var. *capitata* f. *rubra*), acai (*Euterpe oleracea*), purple corn (*Zea mays*), pineapple (*Ananas comosus*), lychee (*Litchi chinensis*) and milk thistle (*Silybum marianum*). Polyphenolic particles may also be obtained from plants that have been processed or modified from their natural state and derivatives of these substances, such as extracts, dried fruits such as raisins and prunes, wine, juice, beer and chocolate.

The polyphenolic particles may be obtained from various plant extracts including oils, essential oils and balsams. Preferred plant extracts include grape seed extract, green tea extract, Japanese knotweed extract, licorice extract, pineapple extract and milk thistle extract (also known as silymarin). Plant extracts that contain polyphenolics will typically include a variety of other substances. The presence in a plant extract of individual substances that are not non-pigmentary does not preclude the use of the plant extract as a source of polyphenolic particles, provided that the entire plant extract is non-pigmentary. Preferably, the plant extracts are not subjected to processing, such as separation, prior to use as a source of polyphenolic particles.

The surfactant may be any surfactant that has strong acid-base interactions with the polyphenolic particles and provides a lipophilic surface treatment on the particles. Examples of suitable surfactants include fatty alcohols and polyols (for example, stearyl alcohol, behenyl alcohol and cetearyl alcohol), fatty acids (for example, stearic acid and oleic acid), amino acids (for example, lauroyl lysine and myristoyl glutamate), polyglyceryl esters (for example, polyglyceryl-3 ricinoleate, polyglyceryl-6 ricinoleate, polyglyceryl-10 pentastearate and polyglyceryl-4 oleate), polyglyceryl polyesters (for example, polyglyceryl-4 diisostearate/polyhydroxystearate/sebacate, polyglyceryl-2 dipolyhydroxystearate and polyglyceryl-3 stearate/isostearate/dimer dilinoleate crosspolymer), polyesters with affinic hydroxyl, amine or amide groups (for example, polyhydroxystearic acid), polyurethanes with affinic hydroxyl, amine or amide groups, polyamides with affinic hydroxyl, amine or amide groups, polyacrylates with affinic hydroxyl, amine or amide groups, phosphate esters (for example, trilaureth-4 phosphate and triceteareth-4 phosphate), polymeric phosphoric acid salts (for example, 1,2-ethanediamine, polymers with aziridine, N-[3-[(2-ethylhexyl)oxy]-3-oxypropyl] derivatives and compounds including polyethylene-polypropylene glycol), phospholipids, ceramides, sphingosides (for example, lecithin, lysolecithin and ceramide 3), substituted silicones with affinic groups (for example, cetyl diglyceryl tris(trimethylsiloxy)silylethyl dimethicone, CAS Number 104780-66-7 (Siloxanes and Silicones, di-Me, 3-hydroxypropyl group-terminated), CAS Number 102782-61-6 (Siloxanes and Silicones, di-Me, 3-hydroxypropyl Me) and CAS Number 106214-84-0 (Siloxanes and silicones, dimethyl, 3-aminopropyl)) and combinations thereof.

Alternatively, lipophilic polyphenolic particles may be formed by reacting the particles with a silanizing agent. The silanizing agent may be any substance that provides functionalized polysiloxanes on the surface of the polyphenolic particles. Examples of suitable silanizing agents include reactive silicone and silane hydrophobizing surface treatments (for example, triethoxycaprylylsilane, octadecyltriethoxysilane, hydrogen dimethicones (CAS Numbers 68037-59-2/69013-23-6/70900-21-9) and CAS Number 69430-47-3 (Siloxanes and Silicones, di-Me, reaction products with Me hydrogen siloxanes and 1,1,3,3-tetramethyldisiloxane)).

The carrier vehicle may be any cosmetically-acceptable fluid or wax that is lipophilic. Examples of suitable carrier vehicles include triglycerides (for example, caprylic/capric triglycerides), esters (for example, C12-C15 alkyl benzoate, isopentyl laurate, isopropyl isostearate, coco-caprylate, ethylhexyl isononanoate, tridecyl salicylate, ethylhexyl isononanoate, isodecyl salicylate, octyldodecyl neopentanoate, butyloctyl salicylate, jojoba esters and shea butter ethyl esters), natural oils and butters (for example, *Simmondsia chinensis* (jojoba) seed oil, shea butter, *Argania spinosa* (Argan) oil, pongami (karanja) oil and *Limnanthes alba* (white meadowfoam) seed oil), alkanes (for example, squalane, hemisqualane, isododecane and isohexadecane), silicones (for example, dimethicone, behenyl dimethicone, cetyl dimethicone, cetearyl methicone and phenyl dimethicone), waxes (for example, natural waxes, synthetic waxes and silicone waxes) and combinations thereof.

The polyphenolic particles may be present in the dispersion in an amount of 0.1-75.0% by weight, including 0.2%, 0.3%, 0.4%, 0.5%, 0.6%, 0.7%, 0.8%, 0.9%, 1.0%, 2.0%, 3.0%, 4.0%, 5.0%, 6.0%, 7.0%, 8.0%, 9.0%, 10.0%, 15.0%, 20.0%, 25.0%, 30.0%, 35.0%, 40.0%, 45.0%, 50.0%, 55.0%, 60.0%, 65.0% and 70.0% by weight. Preferably, the polyphenolic particles are present in an amount of 0.5-50.0% by weight. More preferably, the polyphenolic particles are present in an amount of 1.0-40.0% by weight.

The surfactant may be present in the dispersion in an amount of 1.0-100.0% of the mass of polyphenolic particles, including 1.1%, 1.2%, 1.3%, 1.4%, 1.5%, 1.6%, 1.7%, 1.8%, 1.9%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 15.0%, 20.0%, 25.0%, 30.0%, 35.0%, 40.0%, 45.0%, 50.0%, 55.0%, 60.0%, 65.0%, 70.0%, 75.0%, 80.0%, 85.0%, 90.0% and 95.0% of the mass of the polyphenolic particles. Preferably, the surfactant is present in an amount of 10.0-60.0% of the mass of the polyphenolic particles. More preferably, the surfactant is present in an amount of 20.0-50.0% of the mass of the polyphenolic particles.

The amount of carrier vehicle in the dispersion will be dependent on the amount of the polyphenolic particles and the amount of the surfactant present in the dispersion. After combining the polyphenolic particles and the surfactant, the carrier vehicle may be added in any suitable amount necessary to produce a desired dispersion.

The dispersion may be prepared by conventional formulation techniques. For example, the polyphenolic particles, the surfactant and the carrier vehicle may be combined in a vessel and stirred until homogenous. Appropriate mixing conditions such as temperature, stirring speed and mixing time, may be varied to provide a desired dispersion. The dispersion may then be transferred to a mill, such as a media mill, and comminuted to achieve a desired particle size.

The polyphenolic particles may have a particle size of 0.001-10.0 microns (μm) (1-10,000 nm), including 0.002 μm, 0.003 μm, 0.004 μm, 0.005 μm, 0.006 μm, 0.007 μm, 0.008 μm, 0.009 μm, 0.01 μm, 0.02 μm, 0.03 μm, 0.04 μm, 0.05 μm, 0.06 μm, 0.07 μm, 0.08 μm, 0.09 μm, 0.1 μm, 0.2 μm, 0.3 μm, 0.4 μm, 0.5 μm, 0.6 μm, 0.7 μm, 0.8 μm, 0.9 μm, 1.0 μm, 1.1 μm, 1.2 μm, 1.3 μm, 1.4 μm, 1.5 μm, 1.6 μm, 1.7 μm, 1.8 μm, 1.9 μm, 2.0 μm, 2.5 μm, 3.0 μm, 3.5 μm, 4.0 μm, 4.5 μm, 5.0 μm, 5.5 μm, 6.0 μm, 6.5 μm, 7.0 μm, 7.5 μm, 8.0 μm, 8.5 μm, 9.0 μm and 9.5 μm. Preferably, the polyphenolics have a particle size of 0.01-5.0 μm (10-5,000 nm). More preferably, the polyphenolics have a particle size of 0.1-1.0 μm (100-1,000 nm). The maximum particle size of the polyphenolic particles is 10.0 μm to prevent perception of the particles on the skin and avoid formulations that have a gritty or grainy texture to users.

Lipophilic polyphenolic particles may be obtained from a dispersion of polyphenolic particles, a surfactant and a carrier vehicle by removing the carrier vehicle. For example, the carrier vehicle may be a volatile substance that evaporates at ambient temperature and pressure. Similarly, the dispersion may be heated above the boiling point of the carrier vehicle until the carrier vehicle is removed.

Lipophilic polyphenolic particles also may be prepared directly rather than by isolation from a dispersion. First, the particle size of the polyphenolic particles is reduced by dry comminution. Any suitable dry comminution technique may be used, such as high performance air milling, vibratory milling, media milling, hammer milling and jet milling. The comminution may be carried out neat or in conjunction with a secondary material such as a polymer particle or an oxide (for example, metal oxides and silicates such as mica or silica). Next, a solution is prepared by dissolving the surfactant or silanizing agent into a suitable solvent. Examples of suitable solvents include USP heptane, USP acetone, USP isopropanol and USP ethanol. Then, the solution is sprayed onto the comminuted polyphenolic particles in a blender/mixer under agitation. The solution and comminuted polyphenolic particles may optionally be heated to drive a reaction for binding the surfactant or silanizing agent to the particles. Finally, a vacuum is applied to remove the solvent.

Lipophilic polyphenolic particles may be present in the oil phase of a preparation, or may be added to a powder preparation. Preferably, the preparation is suitable for topical application. Examples of suitable preparations include emulsions (oil-in-water and water-in-oil emulsions), sprays, balms, sticks, powders, powder-to-cream preparations, lipophilic preparations and anhydrous preparations. Preparations including lipophilic polyphenolic particles may be evaluated by one or more tests. Preferably, preparations including lipophilic polyphenolic particles are very water resistant, super photostable and pass the free radical quenching test.

Preparations containing lipophilic polyphenolic particles may be formulated for use in a variety of different applications. Examples of suitable formulations include cosmetics (for example, blushes, face powders, foundations, lipsticks, makeup bases and rouges), skin care products (for example, skin cleansing creams, lotions, liquids and pads; face and neck creams, lotions, powders and sprays; body and hand creams, lotions, powders and sprays; foot powders and sprays; moisturizers; night creams, lotions, powders and sprays; paste masks/mud packs; and skin fresheners) and sunscreens. Sunscreens are particularly preferred formulations. The formulations may be provided in any form suitable for topical administration, such as in the form of a topical suspension, lotion, cream, ointment, gel, hydrogel, foam, paste, tincture, liniment, sprayable liquid, aerosol, stick or powder. The formulations may optionally include inactive ingredients, auxiliaries and/or additives such as co-emulsifiers, fats, waxes, stabilizers, thickeners, biogenic active ingredients, film formers, fragrances, dyes, pearlizing agents, preservatives, pigments, electrolytes and pH regulators.

A sunscreen may include lipophilic polyphenolic particles and a UV radiation protectant. The UV radiation protectant may be any substance that absorbs, reflects and/or scatters UV radiation. The sunscreen may optionally include sun protection factor (SPF) boosters or stabilizers such as methoxycrylene and polyester-8.

Examples of suitable UV radiation protectants include zinc oxide (ZnO), titanium dioxide (TiO$_2$), p-aminobenzoic acid (PABA), padimate O (OD-PABA, octyldimethyl-PABA, σ-PABA), phenylbenzimidazole sulfonic acid (ensulizole, EUSOLEX® 232, PBSA, PARSOL® HS), cinoxate (2-ethoxyethyl p-methoxycinnamate), dioxybenzone (benzophenone-8), oxybenzone (benzophenone-3, EUSOLEX® 4360, ESCALOL® 567), homosalate (homomethyl salicylate, HMS), menthyl anthranilate (meradimate), octocrylene (EUSOLEX® OCR, 2-cyano-3,3-diphenyl acrylic acid, 2-ethylhexylester), octyl methoxycinnamate (octinoxate, EMC, OMC, ethylhexyl methoxycinnamate, ESCALOL® 557, 2-ethylhexyl-paramethoxycinnamate, PARSOL® MCX), octyl salicylate (octisalate, 2-ethylhexyl salicylate, ESCALOL®587), sulisobenzone (2-hydroxy-4-methoxy-benzophenone-5-sulfonic acid, 3-benzoyl-4-hydroxy-6-methoxybenzenesulfonic acid, benzophenone-4, ESCALOL® 577), trolamine salicylate (triethanolamine salicylate), avobenzone (1-(4-methoxyphenyl)-3-(4-tert-butylphenyl)propane-1,3-dione, butyl methoxy dibenzoylmethane, BMDBM, PARSOL® 1789, EUSOLEX® 9020), ecamsule (MEXORYL® SX, terephthalylidene dicamphor sulfonic acid), cerium oxide (CeO$_2$), drometrizole trisiloxane (MEXORYL® XL), bis-ethylhexyloxyphenol methoxyphenyl triazine (TINOSORB® S), bisoctrizole (TINOSORBG™, MILESTAB™ 360) and combinations thereof. Preferred UV radiation protectants include zinc oxide (ZnO), titanium dioxide (TiO$_2$) and combinations thereof. Preferably, the UV radiation protectant has been approved by at least one of the regulatory agencies of the United States (U.S. Food and Drug Administration or FDA), Canada, the European Union, Australia, Japan, Korea, China, Mercosur, the Association of Southeast Asian Nations (ASEAN), the Commonwealth of Independent States (CIS) and the Gulf Cooperation Council (GCC).

Sunscreens that include lipophilic polyphenolic particles offer a number of advantages as compared to conventional sunscreens. The inclusion of polyphenolic particles produces sunscreens that are very water resistant. In addition, the polyphenolic particles allow the sunscreen to block or attenuate both UV radiation and HEV radiation. The polyphenolic particles also are resistant to photo-induced free radical generation by UV radiation and HEV radiation.

Formulations that include lipophilic polyphenolic particles provide a variety of health benefits. Polyphenolic particles act as antioxidants because they are extremely efficient at neutralizing free radicals. These properties allow polyphenolic particles to treat or prevent oxidative stress or damage to the skin, hair and nails. For example, the polyphenolic particles may be used to protect keratinous material (such as the hair, fingernails, toenails and the outer layer of skin), protect human skin, suppress lipid peroxidation, prevent or reduce lines and wrinkles on the skin, prevent loss of elasticity of the skin, prevent thinning of the skin and prevent pigment darkening of the skin. These health benefits may be obtained by applying a formulation containing lipophilic polyphenolic particles to an area of skin.

EXAMPLES

Example 1—Dispersion of Lipophilic Rutin Particles in Caprylic/Capric Triglycerides 30.0 parts by weight of rutin (Sophorajaponica extract containing >96% rutin) was combined with 10.5 parts by weight of polyglyceryl-2 dipolyhydroxystearate and 59.5 parts by weight of caprylic/capric triglycerides. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the rutin particles in the dispersion was measured by static light scattering to be 0.171 microns with no particles detected below 0.1 microns

Example 2—Dispersion of Lipophilic Silymarin Particles in Caprylic/Capric Triglycerides 30.0 parts by weight of silymarin (*Silybum marianum* extract containing >80% silymarin) was combined with 10.5 parts by weight of polyglyceryl-2 dipolyhydroxystearate and 59.5 parts by weight of caprylic/capric triglycerides. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the silymarin particles in the dispersion was measured by static light scattering to be 0.166 microns with no particles detected below 0.1 microns

Example 3—Dispersion of Lipophilic Rutin Particles in Caprylic/Capric Triglycerides 30.0 parts by weight of rutin (*Sophora japonica* extract containing >96% rutin) was combined with 8 parts by weight of polyglyceryl-2 dipolyhydroxystearate, 2.66 parts lecithin, and 59.34 parts by weight of caprylic/capric triglycerides. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the rutin particles in the dispersion was measured by static light scattering to be 0.141 microns with no particles detected below 0.1 microns

Example 4—Dispersion of Lipophilic Rutin Particles in Methylheptyl Isostearate 30.0 parts by weight of rutin (*Sophora japonica* extract containing >96% rutin) was combined with 8 parts by weight of polyglyceryl-4 diisostearate/polyhydroxystearate/sebacate, 2.66 parts lecithin, and 59.34 parts by weight of methylheptyl isostearate. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the rutin particles in the dispersion was measured by static light scattering to be 0.152 microns with no particles detected below 0.1 microns.

Example 5—Dispersion of Lipophilic Rutin Particles in Jojoba Oil 30.0 parts by weight of rutin (*Sophora japonica* extract containing >96% rutin) was combined with 8 parts by weight of polyglyceryl-2 dipolyhydroxystearate, 2.66 parts lecithin, and 59.34 parts by weight of *Simmondsia chinensis* (ojoba) oil. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the rutin particles in the dispersion was measured by static light scattering to be 0.156 microns with no particles detected below 0.1 microns.

Example 6—Dispersion of Lipophilic Green Tea Extract Polyphenolic Particles in C12-15 Alkyl Benzoate 30.0 parts by weight of green tea extract powder (containing >50 total polyphenols with >35% catechins and >15% epigallocatechin gallate) was combined with 8 parts by weight of polyglyceryl-2 dipolyhydroxystearate, 2.66 parts lecithin, and 59.34 parts by weight of C12-15 alkyl benzoate.. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the particles in the dispersion was measured by static light scattering to be 0.150 microns with no particles detected below 0.1 microns.

Example 7—Dispersion of Olive Leaf Extract Polyphenolic Particles in Caprylic/Capric Triglycerides 30.0 parts by weight of *Olea europaea* (olive leaf) extract powder (containing >20% oleuropein) was combined with 8 parts by weight of polyglyceryl-2 dipolyhydroxystearate, 2.66 parts lecithin, and 59.34 parts by weight of caprylic/capric triglycerides. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the particles in the dispersion was measured by static light scattering to be 0.150 microns with no particles detected below 0.1 microns.

Example 8—Dispersion of *Pueraria lobata* Polyphenolic Particles in Caprylic/Capric Triglycerides 30.0 parts by weight of *Pueraria lobata* extract powder (containing >40% total polyphenolic isoflavones) was combined with 8 parts by weight of polyglyceryl-2 dipolyhydroxystearate, 2.66 parts lecithin, and 59.34 parts by weight of caprylic/capric triglycerides. The mixture was stirred until homogenous and transferred to a horizontal media mill and comminuted using 0.3 mm yttria stabilized zirconia media until the maximum particle size was below 0.5 microns as indicated on a 0-12 micron indicating Hegman gauge with a 0.5 scale gradation. The resultant dispersion was pourable. The particle size of the particles in the dispersion was measured by static light scattering to be 0.148 microns with no particles detected below 0.1 microns.

Example 9—Determination of Relative Antioxidant Power of Selected Lipophilic Polyphenolic Particles The dispersions of Example 1 and Example 2 were assayed for antioxidant power using the antioxidant power assay described in Om P. Sharma and Tej K. Bhat, Food Chemistry, Volume 113, Issue 4, 15 Apr. 2009, Pages 1202-1205 using DL-alpha-tocopherol as a reference. It was determined that on a mass basis lipophilic rutin particles demonstrated an antioxidant power 67% that of DL-alpha-tocopherol, while basis lipophilic silymarin particles demonstrated an antioxidant power 50% that of DL-alpha-tocopherol.

Example 10—HEV Blocking of Lipophilic Rutin Particles

The HEV blocking of the dispersion of Example 3 was evaluated where the dispersion was diluted to a rutin concentration of 5% using caprylic/capric triglycerides. HEV blocking was measured using a diffuse transmission method similar to the methods described in 21 C.F.R. § 201.327 (Over-the-counter sunscreen drug products; required labeling based on effectiveness testing) and ISO 24443 (Determination of sunscreen UVA photoprotection in vitro).

1.3 mg/cm$^2$ of the dispersion of the diluted dispersion was applied to the surface of an optical grade polymethylmethacrylate (PMMA) substrate having a roughened three-dimensional surface topography (LabSphere HelioPlate HD6). The sample was then allowed to sit at room temperature for 1 hour. The absorbance of the sample and a control blank optical grade PMMA substrate was measured at the HEV wavelength of 412 nm using a LabSphere UV-2000S spectrophotometer. The net absorbance value was determined by subtracting the absorbance of the control blank substrate from the measured absorbance of the sample on the substrate.

The monochromatic protection factor (MPF) at 412 nm was determined according to the procedures in Bleasel, M. D. et al., "in vitro evaluation of sun protection factors of sunscreen agents using a novel UV spectrophotometric technique", International Journal of Cosmetic Science, Vol. 30, Issue 4, pp. 259-270 (2008). MPF may be expressed by Equation (I) below, where A($\lambda$) is the net absorbance of the sample at wavelength $\lambda$.

$$MPF(\lambda) = \frac{1}{10^{-A(\lambda)}} \quad (1)$$

The results are shown in the table below:

| Sample | Net absorbance (412 nm) | MPF (412 nm) |
|---|---|---|
| Dispersion of Example 3 diluted to 5% rutin content | 1.112 | 12.94 |

Example 11—Water Resistance Study

The water resistance of the dispersion of Example 3 was evaluated using the sample dosed on PPMA of Example 10. Water resistance was measured using an 80-minute water immersion sequence consistent with COLIPA 2005 (Cosmetics Europe, "Guidelines for evaluating sun product water resistance", available online at www.cosmeticseurope.eu/files/7914/6407/7400/Guidelines_for_Evaluating_Sun_Produc t_Water_Resistance_-2005.pdf, 15 pages (2005)) but performed in vitro.

A 22 cm high×16 cm diameter stainless steel vessel was filled with deionized water and maintained at a temperature between 30-33° C. The vessel was stirred at 350 RPM using a 5 cm diameter flat blade impeller throughout the duration of the test. The PMMA applied sample of Example 10 was suspended in the vessel near the wall of the vessel with the applied sample facing the impeller. The sample was removed from the vessel after 80 minutes of immersion and allowed to dry for 1 hour. The net absorbance and the monochromatic protection factor (MPF) was measured as described in Example 10. The results are shown in the table below:

| Measurement | Dispersion of Example 3 |
|---|---|
| Net absorbance (412 nm) before water immersion | 1.112 |
| MPF (412 nm) before water immersion | 12.94 |
| Net absorbance (412 nm) after water immersion | 1.095 |
| MPF (450 nm) after water immersion | 12.45 |
| % MPF maintained | 96 |

The Dispersion of Example 3 was able to maintain 98.5% of the net absorbance (412 nm) and retain 96% of the initial MPF (412 nm) value. These results indicate that the dispersion of Example 1 is very water resistant.

Example 12—Moisturizer with Lipophilic Polyphenolic Particles in the Oil Phase Moisturizer compositions were prepared as a water-in-oil emulsions including the lipophilic polyphenolic particle dispersions of prior examples in the oil phase. The ingredients of the moisturizer composition are shown below:

| Phase | Ingredient | % by weight |
|---|---|---|
| Oil Phase | polyglyceryl-2 dipolyhydroxystearate | 4.00 |
| | polyglyceryl-2 sesquioleate | 2.00 |
| | zinc stearate | 1.00 |
| | Dispersion of lipophilic polyphenolic particles in carrier fluid | Percent by weight of desired amount of polyphenolic particles |
| | squalane | 2.00 |
| | C12-C15 alkyl benzoate | Q.S. |
| | coco-caprylate | 7.00 |
| Water Phase | water | 50.02 |
| | propanediol | 3.00 |
| | tetrasodium glutamate diacetate | 0.03 |
| | USP sodium chloride | 0.80 |
| | preservative | 1.00 |
| | TOTAL | 100.00 |

Using a cold process, the ingredients of the oil phase were combined and mixed until homogeneous, and, separately, the ingredients of the water phase were combined and mixed until homogeneous. The two phases were then combined and homogenized for 4 minutes at 5,000 RPM using a Ross HSM-100LC1 homogenizer. The resultant emulsions were stable after aging at 50° C. for 75 days and very water resistant. The presence of the lipophilic polyphenolic particles produced a moisturizing composition with antioxidant properties.

Example 13—Concealer Stick Lipophilic Polyphenolic Particles in the Oil Phase (Prophetic)

A concealer stick composition is prepared as an anhydrous composition including the lipophilic polyphenolic particle dispersions of prior examples. The ingredients of the concealer stick are shown below:

| Phase | Ingredient | % by weight |
|---|---|---|
| Phase A | coco caprylate | 16.27 |
| | propylheptyl caprylate | 17.00 |
| | Dispersion of lipophilic polyphenolic particles in carrier fluid | Percent by weight of desired amount of polyphenolic particles |
| | titanium dioxide, disodium stearoyl glutamate, aluminum hydroxide | 7.00 |
| | iron oxides, disodium stearoyl, glutamate, aluminum hydroxide | 1.10 |
| Phase B | cetearyl alcohol | 5.00 |
| | hydrogenated castor oil | Q.S. |
| | pentaerythrityl distearate | 4.00 |
| | polyglyceryl-2 dipolyhydroxystearate | 1.00 |
| Phase C | talc | 29.80 |
| | aluminum starch octenylsuccinate | 3.00 |
| Phase D | preservative | 1.00 |
| Phase E | fragrance | 0.50 |
| | TOTAL | 100.000 |

Phase A is combined and mixed under high shear conditions. Phase B is added to Phase A and the mixture is heated to 85° C. under high shear conditions. Phase C is dispersed into the mixture under high shear conditions while maintaining the temperature at 85° C. The batch is then cooled under high shear mixing. Once the mixture cools to below 65° C., Phases D and E are added to the mixture step-wise under high shear mixing conditions. The batch is allowed to cool until the temperature reaches 60° C. The batch is then dispensed into the final packaging. The presence of the lipophilic polyphenolic particles produces a concealer stick with antioxidant properties.

Example 14—Moisturizing Sunscreen with a Phenolic Polymer in the Oil Phase

A sunscreen composition was prepared as a water-in-oil emulsion including the dispersion of Example 1 in the oil phase. The ingredients of the sunscreen composition are shown below:

| Phase | Ingredient | % by weight |
|---|---|---|
| Oil Phase | polyglyceryl-2 dipolyhydroxystearate | 4.000 |
| | polyglyceryl-2 sesquioleate | 2.000 |
| | zinc stearate | 1.000 |
| | Dispersion of lipophilic polyphenolic particles in carrier fluid | Percent by weight of desired amount of polyphenolic particles |
| | squalane | 2.000 |
| | C12-C15 alkyl benzoate | Q.S. |
| | coco-caprylate | 7.000 |
| | USP zinc oxide | 10.000 |
| | triethoxycaprylylsilane | 0.175 |
| | polyhydroxystearic acid | 0.245 |
| Water Phase | water | 50.020 |
| | propanediol | 3.000 |
| | tetrasodium glutamate diacetate | 0.030 |
| | USP sodium chloride | 0.800 |
| | preservative | 1.000 |
| | TOTAL | 100.000 |

Using a cold process, the ingredients of the oil phase were combined and mixed until homogeneous, and, separately, the ingredients of the water phase were combined and mixed until homogeneous. The two phases were then combined and homogenized for 4 minutes at 5,000 RPM using a Ross HSM-100LC1 homogenizer. The resultant emulsion was stable after aging at 50° C. for 75 days and was very water resistant. The presence of the lipophilic polyphenolic particles produced a moisturizing sunscreen with antioxidant properties.

Example 15 Scavenging of Reactive Oxygen Species (ROS) Resulting from HEV Exposure by Lipophilic Polyphenolic Particles Two moisturizer compositions of Example 12 were produced using the dispersion of Example 1 with final rutin concentrations of 0.4% (low) and 1.5% (high). A comparative example composition was produced, as shown below. The high rutin concentration, 1.5% rutin, has the same antioxidant power as the 1.0% DL-alpha-tocopherol, and the 0.4% rutin moisturizer has 25% of their antioxidant power.

| Phase | Ingredient | % by weight |
|---|---|---|
| Oil Phase | polyglyceryl-2 dipolyhydroxystearate | 4.00 |
| | polyglyceryl-2 sesquioleate | 2.00 |
| | zinc stearate | 1.00 |
| | DL-alpha-tocopherol | 1.0 |
| | squalane | 2.00 |
| | C12-C15 alkyl benzoate | Q.S. |
| | coco-caprylate | 7.00 |
| Water Phase | water | 50.02 |
| | propanediol | 3.00 |
| | tetrasodium glutamate diacetate | 0.03 |
| | USP sodium chloride | 0.80 |
| | preservative | 1.00 |
| | TOTAL | 100.00 |

Intracellular Reactive Oxygen Species (ROS) Scavenging Activity Assays were conducted on human skin explants from donors of skin Phototype II. The skin explants were treated with, a non-fluorescent probe, 2', 7'-Dichlorofluorescein diacetate (DCFHDA). After treatment, the skin explants were treated with the moisturizer compositions at a dose of 2 mg/cm$^2$ and exposed to selective HEV wavelengths (412 nm and 450 nm) at doses of 20 J/cm$^2$ in triplicate. DCFH-DA is taken up by cells by passive diffusion and DCFH-DA is deacetylated by cellular esterases to non-fluorescent DCFH, which is trapped within cells. The fluorescent 2', 7'-dichlorofluorescein (DCF) is generated upon enzymatic reduction and subsequent oxidation by ROS. Fluorescence was measured and correlates to the test item's ability to scavenge ROS. The results are presented as percentage reduction of ROS relative to the level generated following UVA/UVB exposure of unprotected skin. The results of these studies are shown in the Table below and presented as percentage reduction in intracellular ROS relative to unprotected skin. It is evident from the results that while the reference DL-alpha-tocopherol shows no statistically significant reduction in ROS, both formulas containing lipophilic rutin particles demonstrated a statistically significant reduction in ROS with associated skin protective effects even when the antioxidant power was introduced at a level of only 25% that of the DL-alpha-tocopherol. These associated skin protective effects include but are not limited to suppressing lipid peroxidation in the skin, preventing or reducing the appearance of lines and wrinkles in skin, preventing loss of elasticity of skin, preventing thinning of skin, and preventing pigment darkening of skin.

| Moisturizer Antioxidant Concentration | Percent ROS Reduction | Statistical Significance |
|---|---|---|
| 412 nm HEV Exposure Donor 1-Phototype II | | |
| 1.0% DL-alpha-tocopherol | 7 | p = 0.4614 |
| 0.4% lipophilic rutin particles | 27 | p = 0.0185 |
| 1.5% lipophilic rutin particles | 61 | p = 0.0002 |
| Donor 2-Phototype II | | |
| 1.0% DL-alpha-tocopherol | −10.3 | p = 0.1407 |
| 1.5% lipophilic rutin particles | 76.8 | p < 0.0001 |
| 450 nm HEV Exposure Donor 1-Phototype II | | |
| 1.0% DL-alpha-tocopherol | 12 | p = 0.1697 |
| 0.4% lipophilic rutin particles | 19 | p = 0.0460 |
| 1.5% lipophilic rutin particles | 36 | p = 0.0023 |
| Donor 2-Phototype II | | |
| 1.0% DL-alpha-tocopherol | 1.24 | p = 0.904 |
| 1.5% lipophilic rutin particles | 59.4 | p = 0.0009 |

Example 16 Scavenging of Reactive Oxygen Species (ROS) Resulting from Solar Simulated UVA/UVB Exposure by Lipophilic Polyphenolic Particles Two moisturizer compositions of Example 12 were produced using the dispersion of Example 2 with final silymarin concentrations of 0.5% (low) and 2.0% (high). The comparative example composition described in Example 15 containing DL-alpha-tocopherol at a concentration of 1.0% (high) was also produced. The high rutin concentration, 1.5% rutin, has the same antioxidant power as the 1.0% DL-alpha-tocopherol, and the 0.4% rutin moisturizer has 25% of their antioxidant power.

Intracellular Reactive Oxygen Species (ROS) Scavenging Activity Assays were conducted on human skin explants from donors of skin Phototype II. The skin explants were treated with, a non-fluorescent probe, 2', 7'-Dichlorofluorescein diacetate (DCFHDA). After treatment, the skin explants were treated with the moisturizer compositions at a dose of 2 mg/cm$^2$ and exposed to solar simulated UVA/UVB at doses of 70 mJ/cm$^2$ in triplicate. DCFH-DA is taken up by cells by passive diffusion and DCFH-DA is deacetylated by cellular esterases to non-fluorescent DCFH, which is trapped within cells. The fluorescent 2', 7'-dichlorofluorescein (DCF) is generated upon enzymatic reduction and subsequent oxidation by ROS. Fluorescence was measured and correlates to the test item's ability to scavenge ROS. The results are presented as percentage reduction of ROS relative to the level generated following UVA/UVB exposure of unprotected skin. The results of these studies are shown in the Table below and presented as percentage reduction in intracellular ROS relative to unprotected skin. It is evident from the results the reference DL-alpha-tocopherol shows a statistically significant reduction in ROS, while both formulas containing lipophilic silymarin particles demonstrated statistically significant larger reductions in ROS with associated skin protective effects even when the antioxidant power was introduced at a level of only 25% that of the DL-alpha-tocopherol. These associated skin protective effects include but are not limited to suppressing lipid peroxidation in the skin, preventing or reducing the appearance of lines and wrinkles in skin, preventing loss of elasticity of skin, preventing thinning of skin, and preventing pigment darkening of skin.

| Moisturizer Antioxidant Concentration | UVA/UVB Exposure Donor-Phototype II | |
| --- | --- | --- |
| | Percent ROS Reduction | Statistical Significance |
| 1.0% DL-alpha-tocopherol | 54 | p = 0.0033 |
| 0.5% lipophilic silymarin particles | 71 | p = 0.0003 |
| 2.0% lipophilic silymarin particles | 74 | P = 0.0002 |

REFERENCES

1. U.S. Pat. No. 6,500,411.
2. U.S. Pat. No. 6,716,418.
3. U.S. Pat. No. 8,309,063.
4. U.S. Pat. No. 8,445,562.
5. U.S. Pat. No. 8,911,976.
6. U.S. Pat. No. 10,035,928.
7. U.S. Patent Application Publication No. 2007/0178057.
8. U.S. Patent Application Publication No. 2010/0202985.
9. U.S. Patent Application Publication No. 2015/0166836.
10. U.S. Patent Application Publication No. 2018/0291210.
11. International Patent Application Publication No. WO 2009/038477.
12. International Patent Application Publication No. WO 2014/144746.
13. International Patent Application Publication No. WO 2014/164418.
14. International Patent Application Publication No. WO 2017/197530.
15. D'Archivio, M. et al., "Bioavailability of the polyphenols: status and controversies", International Journal of Molecular Sciences, Vol. 11, pp. 1321-1342 (2010).
16. "Showing all foods in which the polyphenol Quercetin 3-O-rutinoside is found", Phenol Explorer, available online at phenol-explorer.eu/contents/polyphenol/296, accessed on Mar. 13, 2020.
17. Crozier, A. et al., "Flavonoids", Oregon State University Linus Pauling Institute Micronutrient Information Center, available online at lpi.oregonstate.edu/book/export/html/484 (2016).
18. Ganeshpurkar, A. et al., "The pharmacological potential of rutin", Saudi Pharmaceutical Journal, Vol. 25, pp. 149-164 (2017).
19. Pandey, K. B. et al., "Plant polyphenols as dietary antioxidants in human health and disease", Oxidative Medicine and Cellular Longevity, Vol. 2, No. 5, pp. 270-278 (2009).
20. Vostalova, J. et al., "Skin protective activity of silymarin and its flavonolignans", Molecules, Vol. 24, No. 1022, 12 pages (2019).
21. M. J. Frutos, L. Rincon, and E. Valero-Cases in Nonvitamin and Nonmineral Nutritional Supplements 2019, Chapter 2.14, pp. 111-117.
22. I. Dammak, and P. J. do Amaral Sorbal, Food Bioprocess Technol., 10, 926-939, (2017).
23. G. H. Palliyage, S. Singh, C. R. Ashby, Jr., A. K. Tiwari, and H Chauhan AAPS PharmSciTech 20, 250 (2019).
24. Om P. Sharma and Tej K. Bhat, Food Chemistry, Volume 113, Issue 4, 15 Apr. 2009, Pages 1202-1205.
25. Bleasel, M. D. et al., "In vitro evaluation of sun protection factors of sunscreen agents using a novel UV spectrophotometric technique", International Journal of Cosmetic Science, Vol. 30, Issue 4, pp. 259-270 (2008).
26. Cosmetics Europe, "Guidelines for evaluating sun product water resistance", available online at www.cosmeticseurope.eu/files/7914/6407/7400/Guidelines_for_Evaluating_Sun_Produc t_Water_Resistance_-_2005.pdf, 15 pages (2005).

What is claimed is:

1. A lipophilic dispersion comprising solid rutin particles, a surfactant, and a lipophilic carrier vehicle, wherein the surfactant is coating the surface of the solid rutin particles forming thereby surface modified rutin particles, wherein said rutin particles have a median D50 diameter of 0.1-1.0 microns as measured by static light scattering, and wherein said dispersion is pourable.

* * * * *